(12) United States Patent
Chuang

(10) Patent No.: US 12,038,678 B2
(45) Date of Patent: Jul. 16, 2024

(54) TENSION ADJUSTMENT MECHANISM AND SURVEILLANCE CAMERA

(71) Applicant: VIVOTEK INC., New Taipei (TW)

(72) Inventor: Yao-Nien Chuang, New Taipei (TW)

(73) Assignee: VIVOTEK INC., New Taipei (TW)

( * ) Notice: Subject to any disclaimer, the term of this patent is extended or adjusted under 35 U.S.C. 154(b) by 165 days.

(21) Appl. No.: 17/972,583

(22) Filed: Oct. 24, 2022

(65) Prior Publication Data

US 2023/0161233 A1 May 25, 2023

(30) Foreign Application Priority Data

Nov. 25, 2021 (TW) .................................. 110143990

(51) Int. Cl.
*G03B 17/56* (2021.01)

(52) U.S. Cl.
CPC .................................. *G03B 17/561* (2013.01)

(58) Field of Classification Search
CPC ............................... G03B 17/561; F16M 11/10
See application file for complete search history.

(56) References Cited

U.S. PATENT DOCUMENTS

2005/0259984 A1* 11/2005 Wright ................. G03B 17/561
396/427

* cited by examiner

*Primary Examiner* — Minh Q Phan
(74) *Attorney, Agent, or Firm* — Winston Hsu

(57) ABSTRACT

A tension adjustment mechanism applied to a surveillance camera and includes a base, a positioning component, a first actuating component and a first fixing component. The base includes a first slot and first hole. The positioning component is slidably disposed on the base. The first actuating component has a first fixed end and a first free end opposite to each other. The first fixed end is fixedly disposed on the positioning component. The first free end has an inclined guiding structure and is movably inserted into the first slot. The first fixing component abuts against the inclined guiding structure and is movably locked with the first hole.

19 Claims, 3 Drawing Sheets

TENSION ADJUSTMENT MECHANISM AND SURVEILLANCE CAMERA

BACKGROUND OF THE INVENTION

1. Field of the Invention

The present invention relates to a tension adjustment mechanism and a surveillance camera, and more particularly, to a tension adjustment mechanism of conveniently adjusting the tension of the belt via locking torque and a related surveillance camera.

2. Description of the Prior Art

The surveillance camera uses the special mechanism to adjust the position and angle changes of the lens, such as a tilting angle, a rotating angle and a shifting position. In an example of the rotation adjustment mechanism, the conventional surveillance camera disposes the lens on the turntable, and then sets the belt around the turntable and the motor, and uses the motor to pull the belt for rotating the turntable and adjusting the rotation direction of the lens. However, the tension of the belt may be declined due to factors such as changes in ambient temperature, poor assembly or long-term usage; in the condition, the motor cannot accurately adjust the rotation angle of the lens by pulling the belt and the turntable. The conventional surveillance camera may readjust the installation position or angle of the belt to change the tension, but this operation solution is cumbersome. Thus, how to design a belt tension adjustment mechanism with convenient and quick functions is an important issue in the related mechanical design industry.

SUMMARY OF THE INVENTION

The present invention provides a tension adjustment mechanism of conveniently adjusting the tension of the belt via locking torque and a related surveillance camera for solving above drawbacks.

According to the claimed invention, a tension adjustment mechanism includes a base, a positioning component, a first actuating component and a first fixing component. The base has a first slot and first hole. The positioning component is slidably disposed on the base. The first actuating component has a first fixed end and a first free end opposite to each other. The first fixed end is fixedly disposed on the positioning component. The first free end has an inclined guiding structure and is movably inserted into the first slot. The first fixing component abuts against the inclined guiding structure and is movably locked with the first hole.

According to the claimed invention, a surveillance camera includes an image receiver and a tension adjustment mechanism. The image receiver is adapted to receive an image in one capturing direction. The tension adjustment mechanism is used to change the capturing direction of the image receiver. The tension adjustment mechanism includes a base, a positioning component, a first actuating component and a first fixing component. The base has a first slot and first hole. The positioning component is slidably disposed on the base. The first actuating component has a first fixed end and a first free end opposite to each other. The first fixed end is fixedly disposed on the positioning component. The first free end has an inclined guiding structure and is movably inserted into the first slot. The first fixing component abuts against the inclined guiding structure and is movably locked with the first hole.

The tension adjustment mechanism of the present invention can lock the positioning component on the motor slidably installed on the base. The free end of the positioning component can be slightly moved into or out of the slot on the base via pressure of the fixing component. The movement of the free end can result in the resilient deformation of the positioning component, and the motor can be moved relative to the base accordingly. The tension of the belt can be decreased when the motor is moved close to the image receiver on the base, and can further be increased when the motor is distant from the image receiver on the base. Therefore, an inserting depth of the fixing component inside the locking hole from top to down can be easily and rapidly adjusted to control the tension of the belt, so that the tension adjustment mechanism and the surveillance camera of the present invention have advantages of simple structure, low cost, and accurate and rapid operation.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
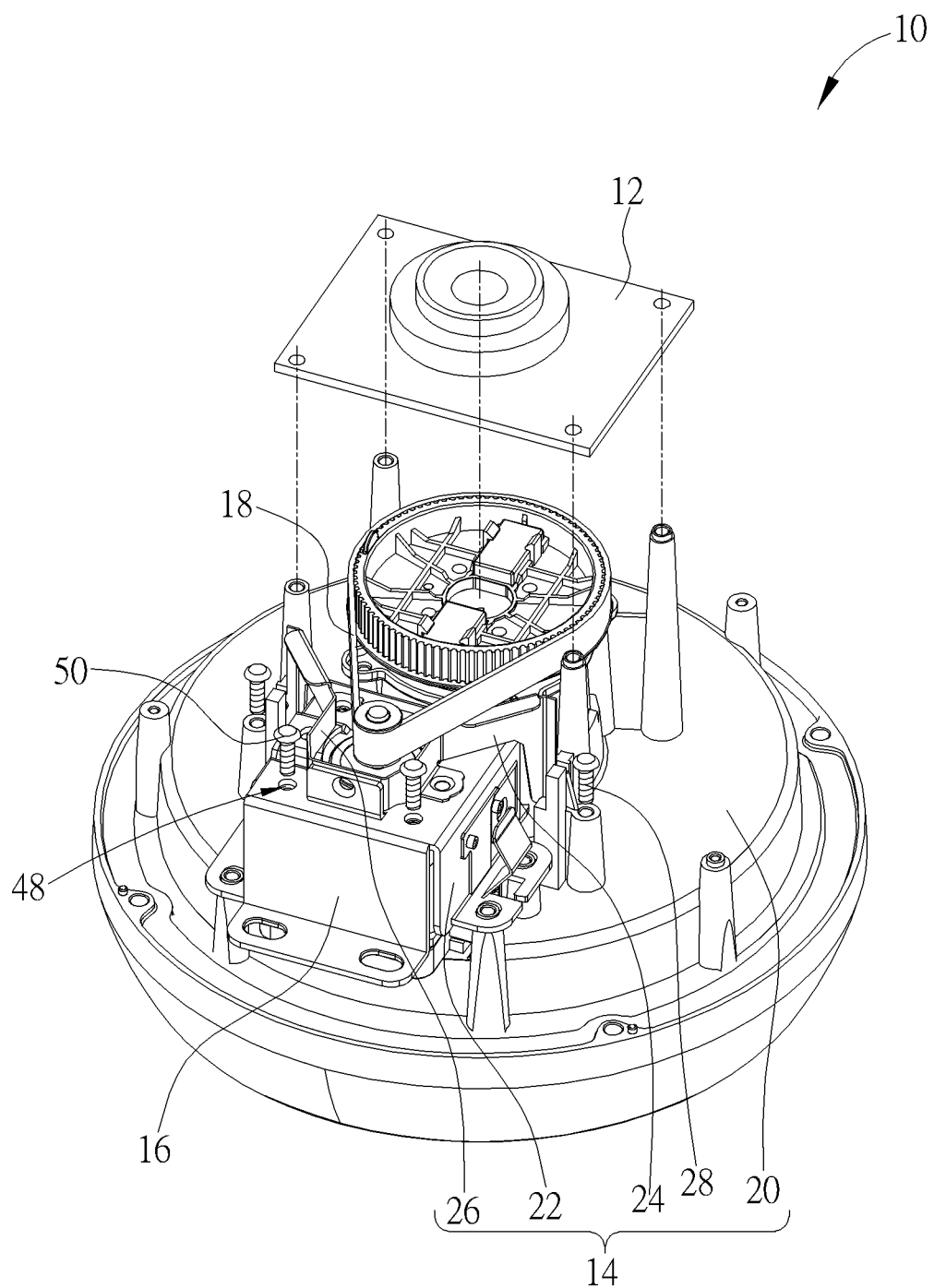
FIG. 1 is a diagram of a part of a surveillance camera according to an embodiment of the present invention.

Please refer to FIG. 1. FIG. 1 is a diagram of a part of a surveillance camera 10 according to an embodiment of the present invention. The surveillance camera 10 can include an image receiver 12 and a tension adjustment mechanism 14. The surveillance camera 10 can utilize a multi-directional control mechanism (which is not marked in the figure) to pan, tilt and rotate the image receiver 12, so that the image receiver 12 can capture or receive a surveillance image in a specific capturing direction. For example, the surveillance camera 10 may utilize a first structural component 16 to move a second structural component 18 so as to change the capturing direction of the image receiver 12. The first structural component 16 can be a motor and the second structural component 18 can be a belt. The tension adjustment mechanism 14 can adjust a tension of the second structural component 18 (such as the belt), and therefore the capturing direction of the image receiver 12 can be accurately controlled via the first structural component 16.

Figure 2:
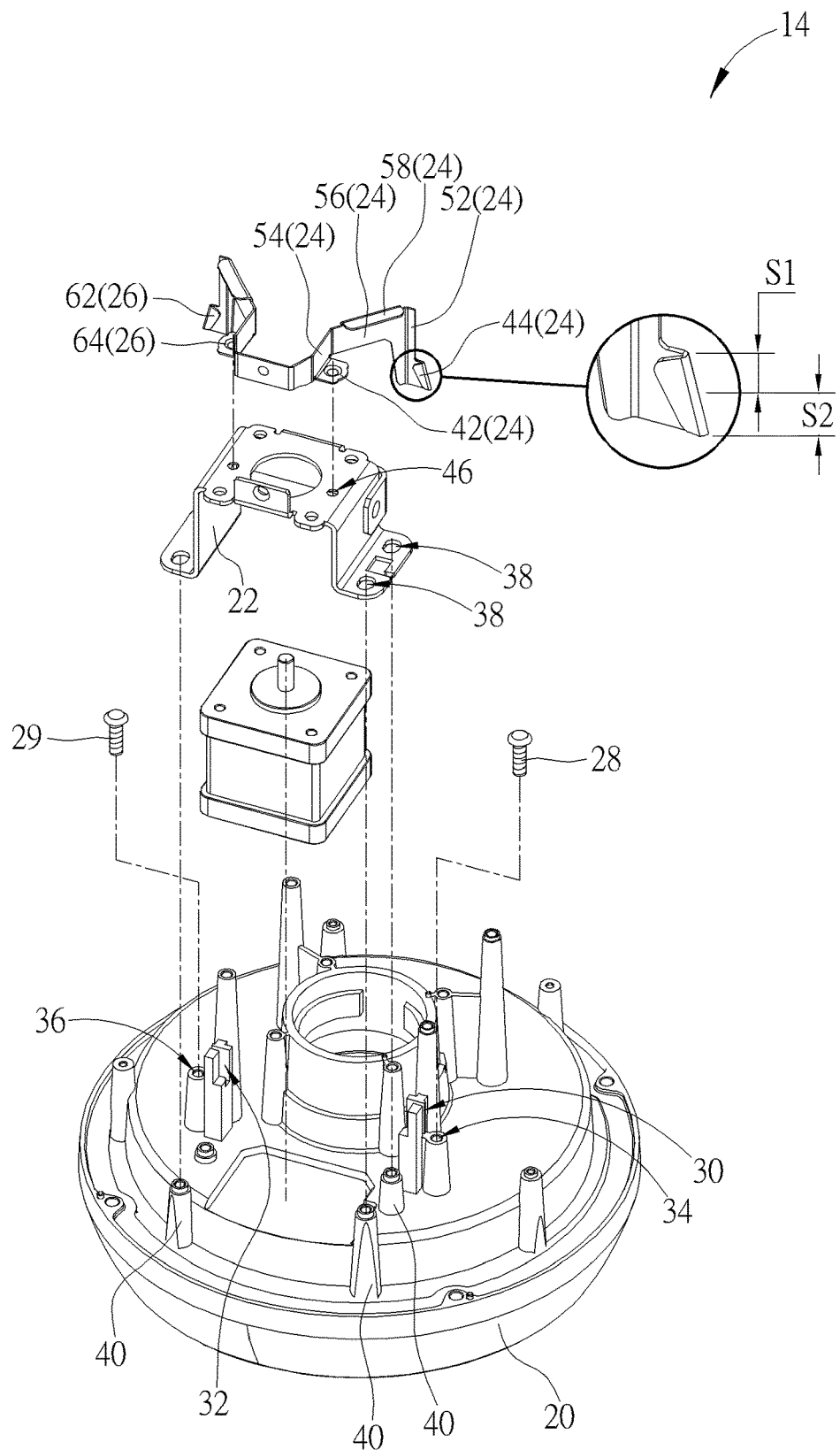
FIG. 2 is an exploded diagram of a tension adjustment mechanism according to the embodiment of the present invention.

Please refer to FIG. 2. FIG. 2 is an exploded diagram of the tension adjustment mechanism 14 according to the embodiment of the present invention. The tension adjustment mechanism 14 can include a base 20, a positioning component 22, a first actuating component 24, a second actuating component 26, a first fixing component 28 and a second fixing component 29. The image receiver 12 can be disposed on the base 20. The base 20 can have a first slot 30, a second slot 32, a first hole 34 and a second hole 36. Position of the slots and the holes can correspond to design of the actuating components and the fixing components. The positioning component 22 can have a plurality of chutes 38; the tension adjustment mechanism 14 can utilize a screw or a bolt (which is not marked in the figure) to pierce through the chute 38 and lock with a post 40 of the base 20. A structural length of the chute 38 can be greater than a radial dimension of the screw or the bolt, and the positioning component 22 can be disposed on the base 20 in a slidable manner.

The first actuating component 24 can have a first fixed end 42 and a first free end 44 opposite to each other. The first fixed end 42 can be fixedly disposed on a locking hole 46 of the positioning component 22 via the screw or the bolt (which is not marked in the figure). The first free end 44 can have an inclined guiding structure movably inserting into the first slot 30. The inclined guiding structure can have an upper section S1 and a lower section S2, and a structural width of the upper section S1 can be smaller than a structural width of the lower section S2. The first fixing component 28 can be the screw, the bolt or any elements with similar functions. The first fixing component 28 can abut against the inclined guiding structure of the first free end 44, and can be locked with the first hole 34 in a relatively movable manner. The first fixing component 28 can be locked into the first hole 34 vertically; when the first fixing component 28 is slid from the upper section S1 to the lower section S2 of the inclined guiding structure, the first free end 44 can be pushed and partly separated from the first slot 30.

The positioning component 22 can be assembled with the first structural component 16 via a locking hole 48 and a locking component 50. As mentioned above, the inclined guiding structure of the first free end 44 can be pressed due to a movement of the first fixing component 28 relative to the first hole 34, so that the first free end 44 of the first actuating component 24 can be partly moved into or out of the first slot 30 for resilient deformation. The resiliently deformed first actuating component 24 can move the positioning component 22 relative to the base 20, so as to increase or decrease an interval between the first structural component 16 and the image receiver 12, and further to pull or release the second structural component 18 assembled with the first structural component 16 for tension change.

In addition, the first actuating component 24 can further include a first actuation section 52, a second actuation section 54, a bridging section 56 and a strengthening section 58. The first actuation section 52 can be connected to the first free end 44. The second actuation section 54 can be connected to the first fixed end 42. The bridging section 56 can be bent and connected between the first actuation section 52 and the second actuation section 54. A vertically structural direction of the first actuation section 52 can be preferably intersected with a sliding direction D of the positioning component 22 relative to the base 20; for example, the foresaid vertically structural direction may be perpendicular to the sliding direction D, which depends on an actual demand. A vertically structural direction of the second actuation section 54 can be preferably parallel to the sliding direction D. Bending design between the first actuation section 52, the second actuation section 54 and the bridging section 56 can improve a resilient recovering property of the first actuating component 24. The strengthening section 58 can be disposed on an upper lateral side of the bridging section 56, and used to increase a structural strength of the bridging section 56 for avoiding unexpected deformation.

Structural features of the second actuating component 26 can be the same as or similar to structural features of the first actuating component 24, which means the second actuating component 26 can have a second fixed end 60 and a second free end 62 opposite to each other. The second fixed end 60 can be fixedly disposed on the positioning component 22. The second free end 62 can be movably inserted into the second slot 32 of the base 20. The inclined guiding structure of the second free end 62 can be inserted into the second slot 32, and the second fixing component 29 can abut against the inclined guiding structure and be locked with the second hole 36 in a relatively movable manner. The inclined guiding structure of the second free end 62 can be pressed due to a movement of the second fixing component 29 relative to the second hole 36, and the second free end 62 of the second actuating component 26 can be partly moved into or out of the second slot 32 for resilient deformation. The resiliently deformed second actuating component 26 can move the positioning component 22 relative to the base 20, so as to increase or decreased the interval between the first structural component 16 and the image receiver 12, and further to adjust the tension change of the second structural component 18.

Figure 3:
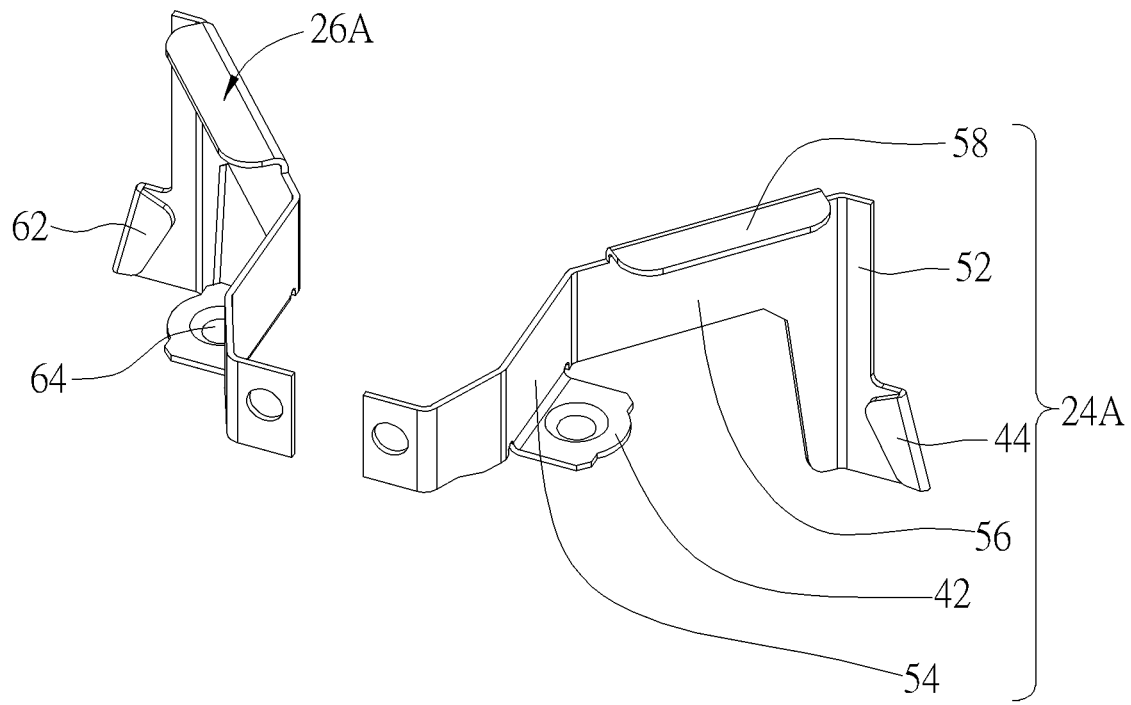
FIG. 3 is a diagram of a first actuating component and a second actuating component according another embodiment of the present invention.

In the embodiment shown in FIG. 2, the first actuating component 24 can be integrated with the second actuating component 26 monolithically, which may be redesigned in accordance with the actual demand. Please refer to FIG. 3. FIG. 3 is a diagram of a first actuating component 24A and a second actuating component 26A according another embodiment of the present invention. In the embodiment, elements having the numerals as ones of the foresaid embodiment have the same structures and functions, and a detailed description is omitted herein for simplicity. The first actuating component 24A and the second actuating component 26A may be two separated elements respectively disposed on a left side and a right side of the positioning component 22. In the embodiment, the first actuating component 24A can be slid relative to the first slot 30, and the second actuating component 26A can be slid relative to the second slot 32; however, the embodiment may be redesigned so that the first actuating component 24A can be slid relative to the first slot 30, but the second slot 32 can be removed to fixedly dispose the second actuating component 26A on the base 20. Besides, the present invention may optionally remove the second hole 36 and the second fixing component 29, so that the second actuating component 26A can be still slid relative to the second slot 32 but the first fixing component 28 can be only used for changing the tension of the second structural component 18. Moreover, the present invention may dispose one of the first actuating component 24A and the second actuating component 26A on the positioning component 22, and the tension adjustment mechanism 14 can be still worked via one actuating component and one fixing component.

Figure 4:
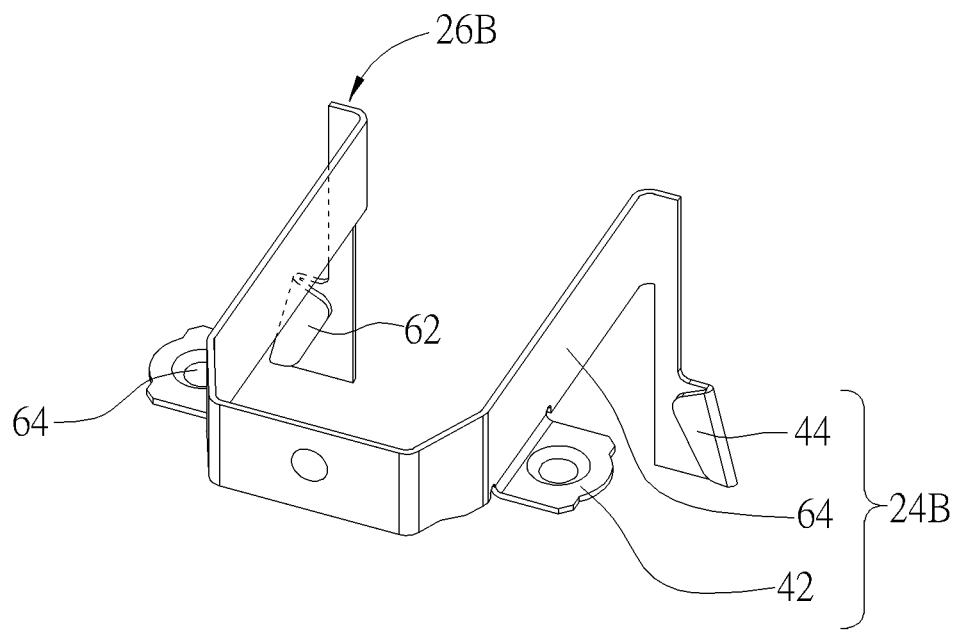
FIG. 4 is a diagram of a first actuating component and a second actuating component according another embodiment of the present invention.

Please refer to FIG. 4. FIG. 4 is a diagram of a first actuating component 24B and a second actuating component 26B according another embodiment of the present invention. In the embodiment, elements having the numerals as ones of the foresaid embodiment have the same structures and functions, and the detailed description is omitted herein for simplicity. Features of the first actuating component 24B can be similar to features of the second actuating component 26B. In an example of the first actuating component 24B, the first actuation section 64 of the first actuating component 24B can be disposed between the first fixed end 42 and the first free end 44. The first actuating component 24B does not have a bending section mentioned in the foresaid embodiment, and therefore has a minimized size so that the tension adjustment mechanism 14 can provide sufficient inner space. The vertically structural direction of the first actuation section 64 can be substantially parallel to the sliding direction D, as shown in FIG. 2. The first actuation section 64 can be deformed when the first free end 44 is pressed, and the positioning component 22 can be guided and moved to adjust the tension change of the second structural component 18.

In conclusion, the tension adjustment mechanism of the present invention can lock the positioning component on the motor slidably installed on the base. The free end of the positioning component can be slightly moved into or out of the slot on the base via pressure of the fixing component. The movement of the free end can result in the resilient deformation of the positioning component, and the motor can be moved relative to the base accordingly. The tension of the belt can be decreased when the motor is moved close to the image receiver on the base, and can further be increased when the motor is distant from the image receiver on the base. Therefore, an inserting depth of the fixing component inside the locking hole from top to down can be easily and rapidly adjusted to control the tension of the belt, so that the tension adjustment mechanism and the surveillance camera of the present invention have advantages of simple structure, low cost, and accurate and rapid operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A tension adjustment mechanism comprising:
   a base having a first slot and first hole;
   a positioning component slidably disposed on the base;
   a first actuating component having a first fixed end and a first free end opposite to each other, the first fixed end being fixedly disposed on the positioning component, the first free end having an inclined guiding structure and being movably inserted into the first slot; and
   a first fixing component abutting against the inclined guiding structure and movably locked with the first hole.

2. The tension adjustment mechanism of claim 1, wherein the positioning component is assembled with a first structural component, the inclined guiding structure is pressed in response to a relative movement of the first fixing component and the first hole so as to resiliently deform the first actuating component and to move the positioning component relative to the base, and a tension of a second structural component assembled with the first structural component is varied accordingly.

3. The tension adjustment mechanism of claim 1, wherein the inclined guiding structure comprises an upper section and a lower section, a structural width of the upper section is smaller than a structural width of the lower section.

4. The tension adjustment mechanism of claim 1, further comprising:
   a second actuating component having a second fixed end and a second free end opposite to each other, the second fixed end being disposed on the positioning component, the second free end being installed on the base.

5. The tension adjustment mechanism of claim 4, wherein the base further has a second slot, and the second free end is movably inserted into the second slot.

6. The tension adjustment mechanism of claim 4, wherein the base further has a second slot and a second hole, the tension adjustment mechanism further comprises a second fixing component, the second free end is movably inserted into the second slot, and the second fixing component abuts against the inclined guiding structure and is movably locked with the second hole.

7. The tension adjustment mechanism of claim 1, wherein the first actuating component comprises a first actuation section disposed between the first fixed end and the first free end, a vertically structural direction of the first actuation section is parallel to a sliding direction of the positioning component relative to the base.

8. The tension adjustment mechanism of claim 1, wherein the first actuating component comprises a first actuation section, a second actuation section and a bridging section, the first actuation section is connected to the first free end, the second actuation section is connected to the first fixed end, the bridging section is bent and connected between the first actuation section and the second actuation section, a vertically structural direction of the first actuation section is intersected with a sliding direction of the positioning component relative to the base, and a vertically structural direction of the second actuation section is parallel to the sliding direction.

9. The tension adjustment mechanism of claim 8, wherein the first actuating component further comprises a strengthening section disposed on a lateral side of the bridging section.

10. A surveillance camera comprising:
    an image receiver adapted to receive an image in one capturing direction; and
    a tension adjustment mechanism of changing the capturing direction of the image receiver, the tension adjustment mechanism comprising:
    a base having a first slot and first hole, the image receiver being disposed on the base;
    a positioning component slidably disposed on the base;
    a first actuating component having a first fixed end and a first free end opposite to each other, the first fixed end being fixedly disposed on the positioning component, the first free end having an inclined guiding structure and being movably inserted into the first slot; and
    a first fixing component abutting against the inclined guiding structure and movably locked with the first hole.

11. The surveillance camera of claim 10, wherein the surveillance camera further comprises a first structural component and a second structural component respectively being a motor and a belt, the surveillance camera utilizes the motor to move the belt so as to change the capturing direction of the image receiver.

12. The surveillance camera of claim 11, wherein the positioning component is assembled with the first structural component, the inclined guiding structure is pressed in response to a relative movement of the first fixing component and the first hole so as to resiliently deform the first actuating component and to move the positioning component relative to the base, and a tension of the second structural component assembled with the first structural component is varied accordingly.

13. The surveillance camera of claim 10, wherein the inclined guiding structure comprises an upper section and a lower section, a structural width of the upper section is smaller than a structural width of the lower section.

14. The surveillance camera of claim 10, wherein the tension adjustment mechanism further comprises a second actuating component having a second fixed end and a second free end opposite to each other, the second fixed end is disposed on the positioning component, and the second free end is installed on the base.

15. The surveillance camera of claim 14, wherein the base further has a second slot, and the second free end is movably inserted into the second slot.

16. The surveillance camera of claim 14, wherein the base further has a second slot and a second hole, the tension adjustment mechanism further comprises a second fixing component, the second free end is movably inserted into the second slot, and the second fixing component abuts against the inclined guiding structure and is movably locked with the second hole.

17. The surveillance camera of claim 10, wherein the first actuating component comprises a first actuation section disposed between the first fixed end and the first free end, a vertically structural direction of the first actuation section is parallel to a sliding direction of the positioning component relative to the base.

18. The surveillance camera of claim 10, wherein the first actuating component comprises a first actuation section, a second actuation section and a bridging section, the first actuation section is connected to the first free end, the second actuation section is connected to the first fixed end, the bridging section is bent and connected between the first actuation section and the second actuation section, a vertically structural direction of the first actuation section is intersected with a sliding direction of the positioning component relative to the base, and a vertically structural direction of the second actuation section is parallel to the sliding direction.

19. The surveillance camera of claim 18, wherein the first actuating component further comprises a strengthening section disposed on a lateral side of the bridging section.

* * * * *